United States Patent Office 3,179,595
Patented Apr. 20, 1965

3,179,595
AQUEOUS SHAMPOO COMPOSITIONS
Frank Wesley Olson, Jr., Pompton Plains, N.J., assignor to Colgate-Palmolive Company, New York, N.Y., a corporation of Delaware
No Drawing. Filed Oct. 28, 1960, Ser. No. 65,579
5 Claims. (Cl. 252—118)

The present invention relates to aqueous shampoo compositions. More particularly, it relates to aqueous liquid shampoos having low freezing points.

Aqueous liquid shampoos are commonly packaged in glass containers, and on freezing of such shampoos, expansion thereof tends to cause the glass bottles to shatter or crack. In order to avoid this, it has previously been proposed to depress the freezing point of aqueous shampoos by the addition thereto of alcohol, glycerine, or propylene glycol. However, the addition of such substances to an established formula in an amount adequate to confer effective antifreeze protection thereon tends to cause the viscosity of the final composition to vary substantially from that which the shampoo composition otherwise would exhibit, with the result that use of the freezing point depressant must be continued throughout the entire year, i.e., in non-freezing weather, in order to produce a product which appears uniform in properties and performance to the consuming public.

The composition of the present invention is highly advantageous in that it makes available formulations which appear to the consumer to be uniform throughout the year, without the necessity for the inclusion of antifreeze therein in other than during freezing weather.

It has now been discovered that it is possible to prepare an aqueous liquid shampoo composition which is protected against freezing by an antifreeze agent which may directly be replaced with water without any substantial change in viscosity of the resulting product. This affords shampoo formulations which may or may not be protected against freezing as desired by the direct interchange of a specified antifreeze agent and a portion of the water present in the formulation without experiencing any substantial variation in content of active washing material or total solids, viscosity of the product, or any other characteristic which may be apparent to the user.

A further advantage of the instant compositions has been found to lie in the manner in which they behave in the event they are frozen. Thus it has been found that if cooled below their freezing point, the instant shampoo formulations solidify slowly and gradually in contrast to the supercooling and very sudden solidification and expansion characteristic of a similar composition in which the instant antifreeze combination is replaced by water. This latter action is much more prone to shatter glass bottles than is the gradual expansion characteristic of the instant shampoos.

In accordance with the present invention an aqueous liquid shampoo protected against freezing comprises an aqueous preparation of water and a water-soluble organic detergent containing, as an antifreeze agent, a mixture of glycerine and sorbitor. In this shampoo the glycerine and sorbitol antifreeze agent is present in an amount sufficient to lower the freezing point of the composition to a temperature not greater than 25° F., preferably below about 23° F. Suitably, the glycerine and sorbitol are present in a ratio of from about 1:1 to 13:1 respectively, as it has been found that within this range of ratios shampoo products may be prepared which exhibit a viscosity which is substantially the same as that exhibited by a similar composition in which the antifreeze agent is replaced by an equal weight of water and which exhibits a freezing point substantially above about 25° F.

The concentration of the detergent in the instant novel liquid shampoo preparations is generally at least about 5%, usually between about 5% to 55%, and preferably from about 15% to 35% by weight. Suitably the detergent of the instant shampoo is a water-soluble organic anionic detergent salt such as a sulfated or sulfonated detergent, or suitable mixtures thereof. These detergents are well-known to the art, and are exemplified by the higher alkyl sulfate salts containing from 10 to 18 carbon atoms such as the water-soluble higher fatty alcohol sulfates, e.g., sodium lauryl sulfate, and the sodium salt of the sulfated mixed fatty alcohols derived from coconut oil by reduction of the fatty acids obtained therefrom, as well as the higher alkyl aryl sulfonate detergents such as those in which the alkyl substituent contains from about 10 to 16 carbon atoms and the aromatic substituent is benzene, toluene, and the like, specific examples thereof being the sodium salt of dodecyl benzene sulfonate and the triethanolamine salt of tridecyl benzene sulfonate. Other well-known examples of suitable anionic organic detergent salts are the water-soluble higher fatty acid soaps containing from about 10 to 18 carbon atoms such as the potassium soap of the mixed higher fatty acids occurring in coconut oil fatty acids and the potassium soap of the mixed higher saturated and unsaturated fatty acids occurring in corn oil. As indicated by the foregoing examples, the cations of the instant water-soluble anionic detergent salts include the alkali metals such as sodium and potassium as well as organic-substituted amines or ammonium derivatives, e.g., the triethanolamine salts.

Organic detergents other than anionic detergent salts may also be employed in the instant compositions, as exemplified by higher fatty acid condensation products with primary and secondary lower alkylolamines, i.e., the higher fatty acid alkylolamides in which the fatty acid contains from about 10 to 18 carbon atoms and the alkylolamine subsituent contains from 2 to about 4 carbon atoms, a well-known suitable example thereof being the diethanolamide of the mixed fatty acids occurring in coconut oil.

The aqueous solvent medium of the compositions of the present invention may constitute tap water, distilled water, deionized water, and the like, deionized or distilled water being preferred. The amount of water present in the final formation should amount to at least 25%, usually about 40% to 85%, and preferably about 55% to 75% of the total weight of the composition.

The proportion of the mixture of glycerine and sorbitol employed as an antifreeze agent in the present shampoos will vary directly with the water content of the product and the freezing point depression desired. Normally a freezing point below about 25° F. is desirable, and preferably one below about 23° F. Accordingly, the mixture will be used in proportions on the order of from 5% to 20% of the final formulation, preferably constituting at least about 10% to 15% thereof. Desirable ratios of glycerine to sorbitol fall within the range of from 1:1 to 13:1, and preferably may be from about 2:1 to 13:1.

The pH of the instant shampoo compositions desirably will fall within the range of from about 3.5 to about 9.5, preferably being in the range of about 6.0 to 8.0. If desired, various adjuvants may also be included in the present formulations, including, inter alia, perfumes, hair conditioners, coloring materials and dyes, preservatives such as sodium benzoate, formaldehyde, and the like, inorganic salts and buffering agents such as monosodium phosphate, pH adjusting constituents such as strong or weak acids or bases, e.g., citric acid, alkoxylated organic compounds such as the condensation product of mixed propylene- and ethylene-oxide with low molecular weight monohydric alcohols, butoxypolyoxypropylene glycol, lanolin and lanolin extracts, anti-bacterial agents such as hexachlorophene, sequestrants such as water-soluble salts of ethylene diamine tetraacetic acid, and the like may be added.

The instant aqueous shampoo compositions are normally fluid and may be in any appropriate form including clear liquids, opaque lotions, and the like.

Inasmuch as it has been found that viscosity is the chief physical characteristic which is effected upon the addition of an antifreeze agent to a flowable liquid shampoo composition, it is appropriate to set forth details of a suitable technique for measuring the kinematic viscosity of such shampoos in terms of the time required for the shampoo to flow under the influence of gravity through a specified orifice at a particular temperature, i.e., 80° F.

The "flow time" is determined in the following manner. A graduated glass 100 milliliter cylinder of 24 centimeters length and 2.5 cm. internal diameter and with the bottom removed is held vertically. Both ends of the cylinder are open. A rubber stopper is used to close off the lower opening; the stopper is bored axially and in the hole is inserted a metal tube of 14 cm. length and 4 millimeters inside diameter, leading from a point near the bottom of the cylinder to the atmosphere. The cylinder is filled to the 100 ml. mark with shampoo at 80° F., the metal tube also being filled, and being closed off at its outlet. The outlet is opened and the time is recorded when 10 ml. of shampoo have flowed out of the cylinder. The time is again recorded when 60 ml. have been drained. The difference is the flow time. The liquid at the 10 ml. height is 15.8 cm. above the top of the metal tube and at the 60 ml. height is 5.1 cm. above that point. In this test the present shampoos exhibit a flow time of about 300–500 seconds, preferably 300–400 seconds. The following examples are given to illustrate additionally the nature of the invention and it will be understood that the invention is not limited thereto. In these examples all parts or proportions are by weight unless otherwise specified.

*Examples I and II*

Suitable clear liquid shampoos consist of:

|  | Example I | Example II |
| --- | --- | --- |
|  | *Percent* | *Percent* |
| Part I: |  |  |
| Diethanolamide of mixed coconut oil fatty acids (92% solids, 8% water) | 5.00 | 5.00 |
| Fractionated lanolin | 0.50 | 0.50 |
| Sorbitol solution (70% sorbitol, 30% water) | 1.00 | 2.00 |
| Glycerin | 9.00 | 8.00 |
| Part II: |  |  |
| Triethanolamine salt of dodecyl benzene sulfonate (60% solids, 40% water) | 13.00 | 13.00 |
| Sodium lauryl sulfate (31.5% solids, 68.5% water) | 30.79 | 30.79 |
| Mixed potassium soaps of corn oil fatty acids and coconut oil fatty acids in a 19:1 ratio as a 20% solution thereof in water | 12.50 | 12.50 |
| Part III: |  |  |
| Monosodium dihydrogen phosphate | 0.50 | 0.50 |
| Deionized water | 27.21 | 27.21 |
| Part IV: |  |  |
| Formalin | 0.10 | 0.10 |
| Perfume | 0.40 | 0.40 |
| Total | 100.00 | 100.00 |

In preparing these shampoos, the constituents of Part I are mixed together in the sequence shown, then the ingredients of Part II are added to Part I in the order listed, each constituent being thoroughly dissolved before the next is added. Following this, Part III is added as a solution, and finally Part IV is added.

These two shampoo products have a pH of 7.5. That of Example I has a freezing point of 21.5° F. Its flow time at 80° F. in the hereinabove described test for measuring viscosity is 305 seconds. The shampoo of Example II has a freezing point of 22.5° F. and its flow time at 80° F. in the described test is 343 seconds.

In comparison with the compositions of the foregoing examples, similarly formulated shampoos in which the 10° of sorbitol solution and glycerine of the examples is replaced with 10% of deionized water characteristically exhibits a freezing point of 29° F. and a flow time in the hereinabove described viscosity test of 350 seconds at 80° F. Similarly, comparable compositions in which 10% glycerine or 10% propylene glycol is employed in lieu of the glycerine and sorbitol of the formula of this example exhibit flow times of 261 and 18 seconds respectively at 80° F. in the above-described test.

Although the present invention has been described with reference to particular embodiments and examples, it will be apparent to those skilled in the art that variations and modifications of this invention can be made and that equivalents can be substituted therefor without departing from the principles and true spirit of the invention.

What is claimed is:

1. An aqueous liquid shampoo composition protected against freezing at temperatures above about 25° F. which consists essentially of an aqueous preparation of about 25% to 85% water and about 5% to 55% of a water-soluble organic anionic detergent salt selected from the group consisting of higher fatty acid soaps containing from about 10 to 18 carbon atoms, higher alkyl sulfate salts containing from about 10 to 18 carbon atoms, and higher alkyl substituted benzene sulfonate salts wherein said higher alkyl constituent contains from about 10 to 16 carbon atoms, and, as an antifreeze agent, a mixture of glycerine and sorbitol in an amount from 5% to 20% of the composition, said glycerine and said sorbitol being present in a ratio of from about 1:1 to 13:1 respectively, said composition being characterized by a kinematic viscosity which is substantially the same as that exhibited by a similar composition in which the glycerine and sorbitol are replaced by an equal weight of water.

2. An aqueous liquid shampoo composition protected against freezing at temperatures above about 23° F. which consists essentially of about 55% to 75% of water, from about 15% to 35% of a water-soluble organic anionic detergent salt selected from the group consisting of water-soluble higher fatty acid soaps containing about 10 to 18 carbon atoms, higher alkyl sulfate salts containing from about 10 to 18 carbon atoms, and higher alkyl substituted benzene sulfonate salts wherein said higher alkyl constituent contains from about 10 to 16 carbon atoms, and, as an antifreeze agent, about 10% to 15% of a mixture of glycerine and sorbitol in a ratio of from about 2:1 to 13:1, said composition being characterized by a kinematic viscosity which is substantially the same as that exhibited by a similar composition in which the glycerine and sorbitol are replaced by an equal weight of water.

3. An aqueous liquid shampoo as set forth in claim 2 which contains an alkylolamide condensation product of a higher fatty acid containing from about 10 to 18 carbon atoms with a lower alkylolamine containing from about 2 to 4 carbon atoms.

4. An aqueous liquid shampoo composition as set forth in claim 2 having a pH of from about 6.0 to 8.0.

5. An aqueous liquid composition as set forth in claim 2 which contains a mixture of about 2.5% water-soluble higher fatty acid soap, about 7.8% of water-soluble higher alkyl benzene sulfonate and about 9.7% of said water-soluble alkyl sulfate.

References Cited by the Examiner

UNITED STATES PATENTS 1,900,014  3/33  Graves _____ 252—73
2,607,740  8/52  Vitale et al. _____ 252—153

JULIUS GREENWALD, *Primary Examiner.*

UNITED STATES PATENT OFFICE
CERTIFICATE OF CORRECTION

Patent No. 3,179,595 April 20, 1965

Frank Wesley Olson, Jr.

It is hereby certified that error appears in the above numbered patent requiring correction and that the said Letters Patent should read as corrected below.

Column 1, line 60, for "sorbitor" read -- sorbitol --; column 2, line 36, for "subsituent" read -- substituent --; column 4, line 1, for "10°" read -- 10% --.

Signed and sealed this 21st day of September 1965.

(SEAL)
Attest:

ERNEST W. SWIDER
Attesting Officer

EDWARD J. BRENNER
Commissioner of Patents